(12) United States Patent
Bessacini et al.

(10) Patent No.: US 6,259,974 B1
(45) Date of Patent: Jul. 10, 2001

(54) AUTOMATED BALLISTIC CONSTANT DETERMINATION

(75) Inventors: Anthony F. Bessacini, Narragansett; Robert F. Pinkos, Saunderstown; Eugene Bessacini, Jr., North Kingstown, all of RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/536,489

(22) Filed: Mar. 27, 2000

(51) Int. Cl.$^7$ ............... G05D 1/00; B60L 15/00; G01C 22/00; F41G 7/00; F42B 19/00

(52) U.S. Cl. ............ 701/1; 701/21; 701/23; 701/302; 244/3.1; 244/3.15; 244/3.21; 114/20.1; 114/23

(58) Field of Search ............ 701/1, 21, 302, 701/23, 204, 2, 6; 114/20.1, 21.1, 21.3, 23, 24, 25, 121, 316, 317; 318/588, 589, 548; 244/3.15, 3.2, 3.16, 3.17, 3.18, 3.21, 3.22; 89/1.8

(56) References Cited

U.S. PATENT DOCUMENTS

| | | | | |
|---|---|---|---|---|
| 3,019,969 | * | 2/1962 | Abt et al. ............ | 235/403 |
| 3,566,743 | * | 3/1971 | Frohock ............ | 89/41.19 |
| 4,568,823 | * | 2/1986 | Diehl et al. ............ | 235/404 |
| 5,071,087 | * | 12/1991 | Gray ............ | 244/3.15 |
| 5,082,200 | * | 1/1992 | Gray ............ | 244/3.15 |
| 5,319,556 | * | 6/1994 | Bessacini ............ | 701/21 |
| 5,337,649 | * | 8/1994 | Franzen et al. ............ | 89/14.05 |
| 5,379,966 | * | 1/1995 | Simeone et al. ............ | 244/3.11 |
| 5,435,503 | * | 7/1995 | Johnson, Jr. et al. ............ | 244/3.15 |

\* cited by examiner

*Primary Examiner*—Jacques H. Louis-Jacques
*Assistant Examiner*—Brian J. Broadhead
(74) *Attorney, Agent, or Firm*—Michael J. McGowan; Prithvi C. Lall; Michael F. Oglo

(57) ABSTRACT

A method for the automated generation of ballistic constants for use in a trajectory control system. The potential trajectory of a pursuing vehicle is divided into a plurality of multiple sequential phases wherein each phase is characterized by a plurality of ballistic parameters. Known simulated data from a number of runs concerning the pursuing vehicle is analyzed. Ballistic parameter values for each run are obtained and statistically analyzed to produce generic constants for a particular set of operating conditions. Resulting matrices are stored as part of a two-dimensional, kinematic vehicle model to facilitate the propagation of projected trajectories during firing control solutions.

20 Claims, 6 Drawing Sheets

AUTOMATED BALLISTIC CONSTANT DETERMINATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to trajectory control and more specifically to the formation of generic models used to produce guidance parameters that are used in directing a pursuing vehicle to a target vehicle.

(2) Description of the Prior Art

Trajectory control of pursuing vehicles, such as torpedoes, can be classified as "post-launch" or "pre-launch" control. In post-launch control, a pursuing vehicle receives updated guidance information after its launch from a launching vehicle, such as a submarine, until the communications link between the pursuing vehicle and the launching vehicle is no longer intact. U.S. Pat. No. 5,319,556 (1994) to Bessacini discloses one embodiment of a post-launch control system with an adaptive trajectory apparatus and method for providing, at and after the launch, vehicle control commands to steer a torpedo (a pursuing vehicle) from a submarine (a launching vehicle) toward a contact (a target vehicle). The development of the commands depends, in part, on the information received from a generic model of the torpedo that is launched.

In a pre-launch control system, the pursuing vehicle, or torpedo, receives all the guidance parameters prior to launch. The control system responds to estimates of current target vehicle state and classification to establish target vehicle operating characteristics in order to project an anticipated target vehicle trajectory. A representation of a pursuing vehicle characteristic trajectory derived from a corresponding generic model of the pursuing vehicle provides a projected pursuing vehicle trajectory based upon initially provided parameters. Iterative processing of the functional forms of these two trajectories, starting with the initially provided parameters, provides successive operating parameter solutions that converge to generate the guidance parameters that are transferred to the pursuing vehicle immediately prior to launch. Since the computation of these guidance solution parameters must be performed every update cycle of the control system, the iterative processing must converge to the guidance solution within each update cycle. The development of these parameters, therefore, is dependent upon the information received from a generic model of that pursuing vehicle.

Both post-launch and pre-launch systems therefore depend upon information in a generic model of the pursuing vehicle. Consequently, to a significant degree the accuracy of the guidance commands or parameters supplied to the pursuing vehicle is dependent upon the accuracy with which the information in the generic model describes the actual trajectory of the pursuing vehicle.

A generic model must, as known, take into account the physical characteristics of the pursuing vehicle under a variety of kinematic states. One approach has been to define the operations of the pursuing vehicle through a set of one or more ballistic constants. For example, U.S. Pat. No. 3,566,743 (1971) to Frohock discloses a kinematic device for fire control against terrestrial targets with a single rate sensor. A ballistic calculator in this system, for example, provides appropriate ballistic values that correspond to the characteristics of a round being fired to develop a ballistic correction that can account for the difference between ballistic trajectory and the line of sight. This is a single plane vertical correction and involves only one ballistic constant. U.S. Pat. No. 5,379,966 (1995) to Simeone et al. discloses a missile guidance system for kinematic states that produces initial tracking information based upon a model. The system then reverts to sensed position information for the projected missile trajectory. Both of these systems rely upon models for anticipating the trajectory of a pursuing vehicle.

Other systems also rely on a vehicle model. U.S. Pat. No. 5,071,087 (1991) to Gray discloses a method for guiding an in-flight vehicle to a desired flight path. U.S. Pat. No. 5,082,200 (1992) to Gray discloses a method for guiding an in-flight vehicle toward a target. U.S. Pat. No. 5,435,503 (1995) to Johnson et al. discloses a real time missile guidance system. Each of these systems relies upon some type of pursuing vehicle model to generate an initial set of flight conditions or to assist in the tracking of a particular vehicle.

Initial approaches for producing generic models for torpedoes as pursuing vehicles involved the in-water testing of actual torpedoes. In essence, torpedoes were launched with known guidance parameters or presets and tracked. The measured trajectory information from multiple tests for a given set of presets was combined to produce an average trajectory that, in turn, yielded a basic set of ballistic constants for the generic model for that set of presets. To encompass the spectrum of possible geometries (tactical situations) and presets, a large number of ballistic constants need to be determined requiring an enormous number of runs to be made. This approach is extremely undesirable. The most important drawback is that the in-water runs are extremely costly and time-consuming. Thus, the number of runs required to ensure robust generic model operation for underwater trajectory systems cannot be made. In addition, any modification to torpedoes requires that all the runs be remade thereby resulting in excessive cost and unacceptable time delays.

More recently there has been developed a six-degree of freedom model simulator that, for a given set of input conditions and characteristics, simulates the track of a torpedo or similar pursuing vehicle for any specified run. Data from each run and from each group of runs for a given set of input conditions and characteristics are then analyzed for determining the ballistic constants based upon average performance. This is a high fidelity simulator that has essentially eliminated the need for actually firing torpedoes. However, for recent torpedo applications the ballistic constant matrices have become quite extensive (i.e., thousands of entries) and require hundreds of thousands of runs to be generated. While the generation of run data can be done must faster using this high fidelity model, the task of analyzing, extracting, and averaging the ballistic constants is still done on a run-by-run basis. This approach is tedious and time-consuming and restricts the number of runs that can be processed. A partitioning of the operation of the vehicle into segments or phases allows for the characterization of the operational features important to the generic model in the trajectory control system. Parameters referred to as ballistic parameters that are sets of constants are determined for each of the phases. The phases and associated ballistic parameters allow for the automatic determination of the sets of ballistic constants for each phase in an efficient manner. Consequently, none of the current trajectory model systems, including the aforementioned models disclosed in the above-identified Untied States Patent Letters, incorporate any mechanism for the automatic extraction of sets of ballistic constants from six degree of freedom simulations.

SUMMARY OF THE INVENTION

Therefore, it is an object of this invention to provide a method for generating a pursuing vehicle model with improved accuracy that will run faster than real time for use in trajectory control systems.

Another object of this invention is to provide a method for generating a torpedo model having ballistic constants that have improved accuracy.

Still another object of this invention is to provide an automated method for generating ballistic constants for a generic torpedo model that enables the generation of an entire projected trajectory faster than real time that accurately predicts an actual trajectory.

In accordance with this invention a first step in generating ballistic constants for use in a generic model for a group of pursuing vehicles, such as torpedoes, defines a plurality of generic, sequential operating phases that apply to all the pursuing vehicles in that group. A second step defines for each of the sequential operating phases, a plurality of generic ballistic parameters that accurately describe vehicle operation during each of the generic operating phases. Then the primary tactical setting dependencies of each of these ballistic parameters are determined for each of the operating phases. Next the method extracts data from that supplied by a six degree of freedom model of a specific pursuing vehicle under a variety of operating conditions defined by the primary tactical setting dependencies over an interval incorporating all the defined sequential operating phases. For each run ballistic parameter values are extracted from this six degree of freedom model data for each of the operating conditions and for each of the operating phases. A statistical analysis then determines the average ballistic parameter values using the individual run ballistic parameter values for each of the operating conditions and operating phases. The results of this analysis produce, for each operating phase, matrices of ballistic constants for at least one operating condition.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
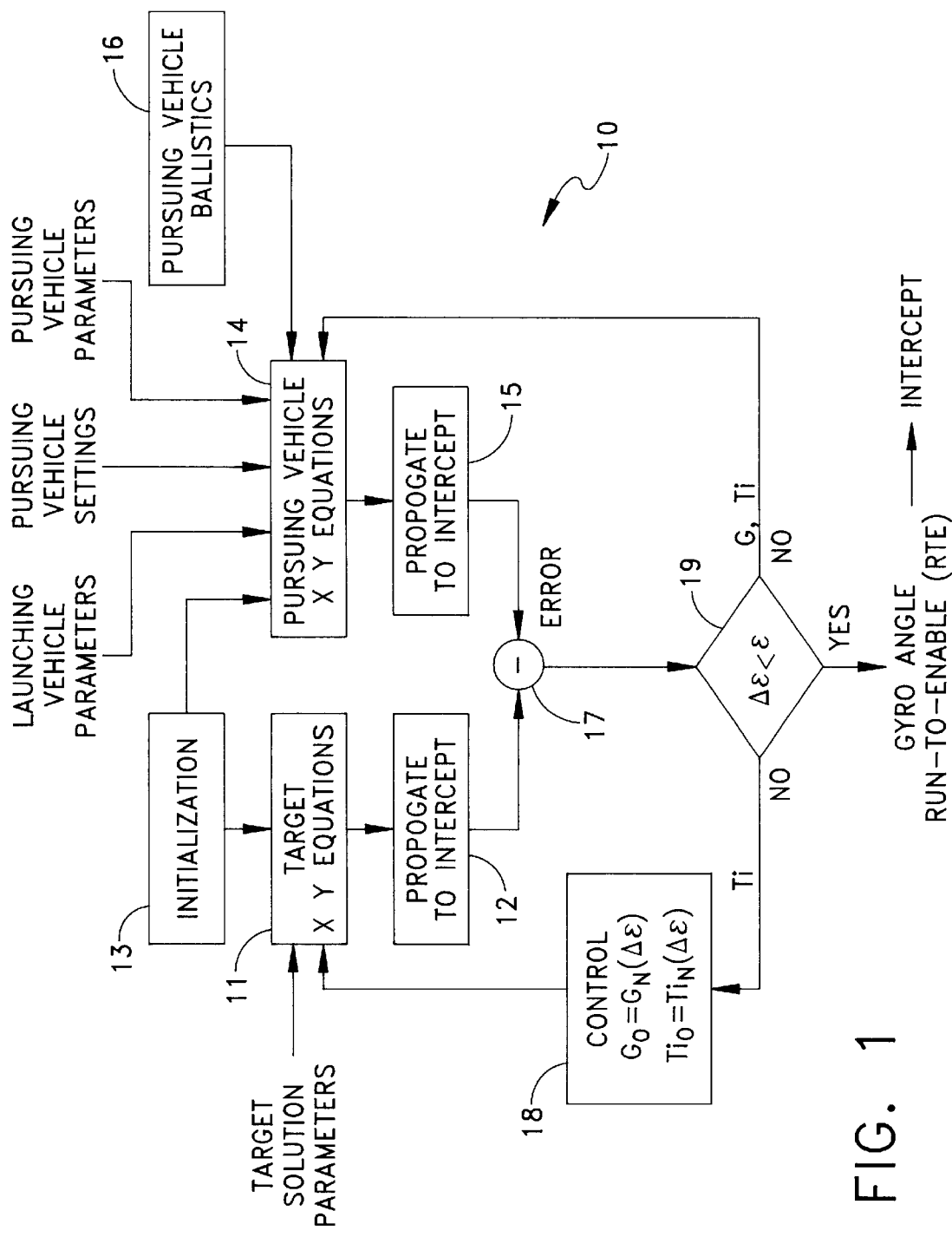
FIG. 1 depicts the basic elements of a pre-launch control system adapted for using this invention.

For purposes of a basic understanding of the application of this invention, FIG. 1 depicts a pre-launch control system 10 that generates two input parameters for transfer to a pursuing vehicle in the form of a torpedo; namely a gyro turn angle and a run-to-enable of which point the pursuing vehicle sensors are activated. A TARGET X Y EQUATIONS module 11 and a target PROPAGATE TO INTERCEPT module 12 receive information about the target in terms of its range, course, bearing and speed, defined as target solution parameters, to generate a projected target trajectory. An INITIALIZATION module 13 establishes initial conditions (initial estimates of unknowns) used by the TARGET X Y EQUATIONS module 11 and the target PROPAGATE-TO-INTERCEPT module 12 to produce a projected target trajectory. The inputs to the PURSUING VEHICLE X Y EQUATIONS module 14 include parameters relating to the launching vehicle and pursuing vehicle. Launcher course and tube cant represent typical launching vehicle parameters. Settings for the pursuing vehicle include pre-enable speed, search speed, search depth, etc.; and pursuing vehicle parameters include laminar distance, gyro drift rate, etc. The initial conditions (i.e., estimates) from the INITIALIZATION module 13 along with inputs from PURSUING VEHICLE BALLISTICS module 16 are used by the PURSUING VEHICLE X Y EQUATIONS module 14 and the pursuing vehicle PROPAGATE TO INTERCEPT module 15 to produce a projected pursuing vehicle trajectory. The values in the PURSUING VEHICLE BALLISTICS module 16 are ballistic constants that are formed in accordance with this invention and constitute a pursuing vehicle model and are key to the operation of the pre-launch control system.

The paths involving the modules 11 and 12 and 14 and 15 produce trajectories as a function of time. An error circuit 17 determines the distance between the pursuing vehicle and the target vehicle at a predicted intercept time (Ti). A control module 19 produces an error function related to any distance between the pursuing vehicle and the target vehicle at the projected intercept time. If the error is greater than a predetermined amount, such that convergence does not occur, a control module 18 provides new information in the form of a new intercept time and gyro angle to modules 11 and 14 to produce another solution. When the solutions converge, module 19 determines a run to enable from the intercept time and transfers the gyro angle and run to enable that resulted from the convergence of the pursuing vehicle and target at intercept.

Figure 2:
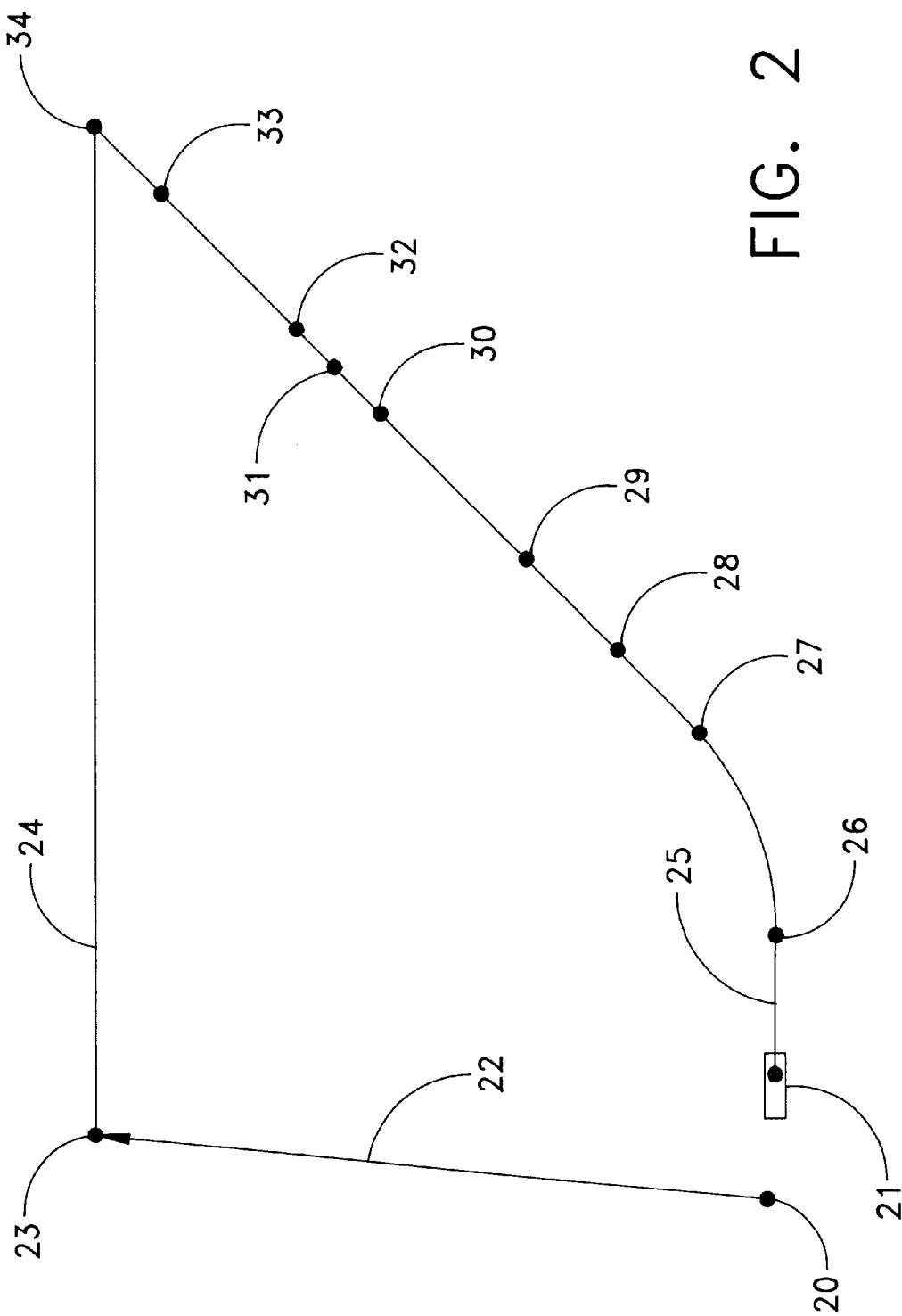
FIG. 2 depicts the basic operating states of a torpedo during its travel from a launching vehicle to a target.

The equations in the modules 11 and 14 operate with two-dimensional target and pursuing vehicle trajectories. FIG. 2 depicts certain events along these trajectories that are important to an understanding of this invention. More specifically FIG. 2 shows the reference point 20 of a launching vehicle and the reference position 21 of a pursuing vehicle in the launching tube at the time of launch. A vector 22 represents the range and bearing to the target vehicle at location 23 at the launch time. Analysis of successive vectors taken over a timing interval produces the course and speed of the target vehicle along a track 24 that in this case is assumed to be a straight line, but may, as known, incorporate evasion tactics.

Initially the torpedo 21 travels in a straight line trajectory 25, until the beginning of a series of maneuvers at a point 26 that involves a gyro turn, a possible change of pitch to allow the torpedo to rise or dive, and an acceleration to a preset speed. Points 27, 28 and 29 define the completion of the gyro turn, dive and/or climbing and acceleration maneuvers. Although shown in that sequence, the actual sequence will be arbitrary and determined primarily by the specific situation. Point 30 represents a time at which the torpedo begins maneuvers to a search depth and point 31 represents the end of that maneuver. Point 32 defines the time at which sensors on the device are activated in a final search phase. Point 33 represents the time at which the pursuing vehicle sensors should acquire the target at point 34 for interception.

Figure 3:
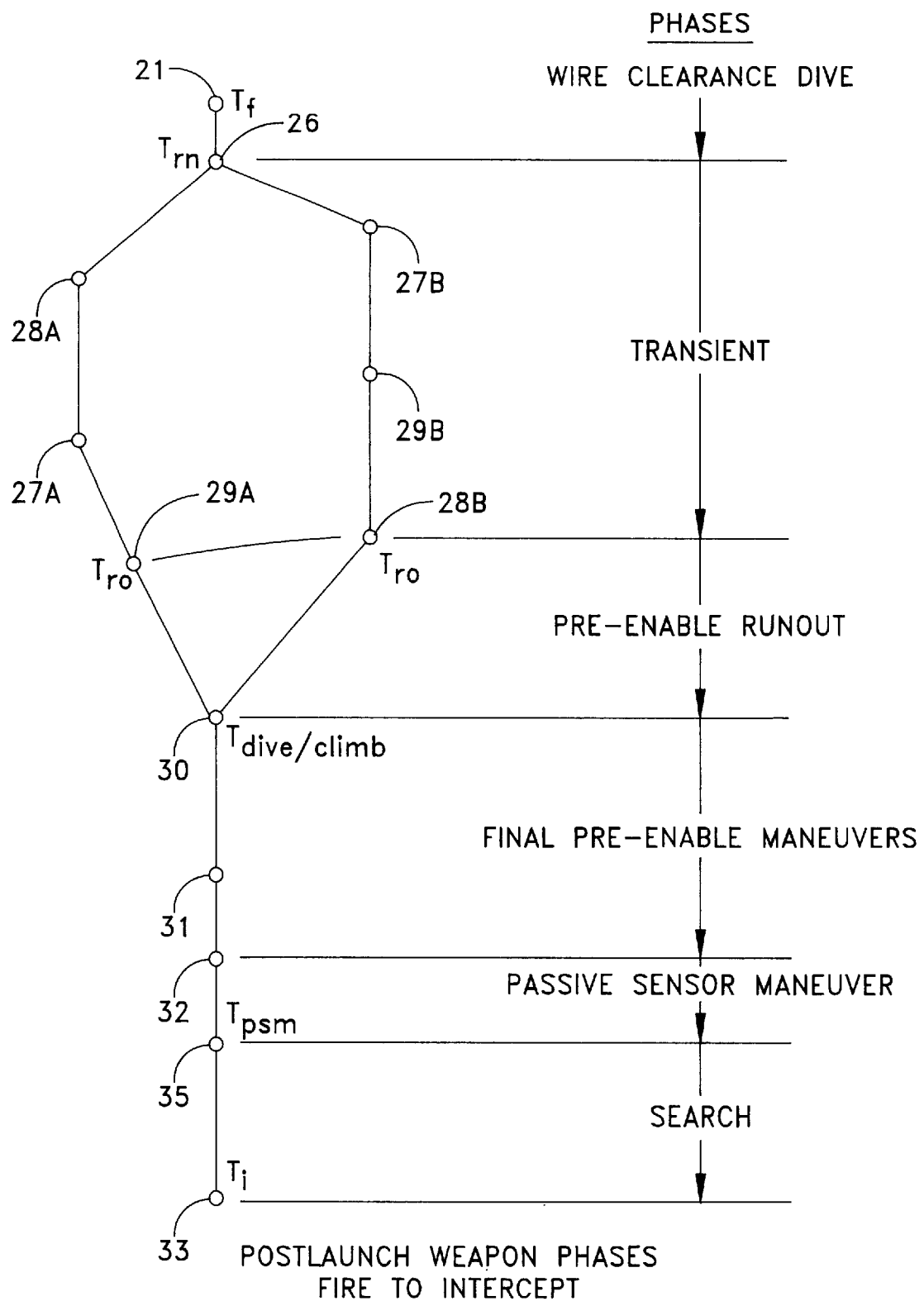
FIG. 3 depicts the definition of the segments comprising certain torpedo operating phases that are useful in this invention.

FIG. 3 depicts these individual states in a time line that begins at time $T_f$ representing the launch or firing time. At a later time, $T_{rh}$, represented by point 26, the torpedo begins the gyro turn, depth change and acceleration maneuvers. Points 28A, 27A and 29A represent a sequence in which the change in depth, gyro turn, and torpedo acceleration are completed in that order. Points 27B, 29B and 28B represent a sequence in which the gyro turn, the acceleration and dive are completed in that order. A $T_{ro}$ point represents the time at which all of these maneuvers are completed and starts pre-enable runout.

Thereafter the various times corresponding to the start of the final maneuvers to search depth ($T_{dive/climb}$) at position 30, the end of the final dive/climb at point 31, the attaining of search speed and the enablement of the sensors ($T_{enable}$) at position 32 and the time of intercept ($T_i$) at position 33 are shown. A $T_{PSM}$ time at position 35 represents the time at which passive sensor calibration maneuvers are completed.

In accordance with one aspect of this invention, a torpedo trajectory from launch to intercept as shown in FIGS. 2 and 3 is defined by a plurality of generic, sequential operating phases that apply to all the torpedoes of a particular type. In essence the operating phases selected are specific enough to represent the important behavioral features of the vehicle of interest accurately and yet general enough to encompass most of future vehicle designs that may be under consideration. For this particular torpedo type or model, and for torpedoes generally, the definition defines six operating phases.

A first phase, or wire clearance dive phase, corresponds to an interval between a launch time, $T_f$ at position 21 and the beginning of initial maneuvers at time, $T_{rh}$, at position 26. Essentially the wire clearance dive phase begins when the vehicle is launched and ends when the gyro turn and other initial maneuvers as a group begin.

A second phase, or transient phase, corresponds to an interval between the $T_{rh}$ time and the $T_{ro}$ time at position 29A or 28B in FIG. 3. The transient phase is the portion of the trajectory in which a torpedo executes any and all defined maneuvers to achieve a runout state during which it will travel to the dive/climb position 30. As previously indicated, the timing and sequence of the occurrence of the various states represented by positions 27, 28 and 29 in FIG. 2 will vary with each projected trajectory for a given firing solution.

A third phase, or pre-enable runout phase, covers the interval from the $T_{ro}$ time to the time $T_{dive/climb}$ at which the torpedo begins a final maneuver to search depth at position 30. During this phase the torpedo generally travels in a straight line and constant depth over a distance necessary to bring the torpedo within a range of the target that allows the torpedo to search for the target with on-board sensors.

A fourth phase, or final pre-enable maneuvers phase, covers the interval during which the torpedo travels from position 30 to position 32. This is the interval between the beginning of the final dive/climb at $T_{dive/climb}$ and the time the torpedo sensors are enabled at $T_{enable}$ at position 32. During this interval the torpedo maneuvers to a search depth and speed.

A fifth phase, or passive sensor maneuver phase, defines the interval during which the torpedo travels from position 32, represented by $T_{enable}$, to position 35, represented by $T_{PSM}$. This phase enables the torpedo to calibrate sensory systems.

The sixth phase, or search phase, extends from position 35 at time $T_{PSM}$ to the predicted intercept at position 33 at time $T_i$. At time $T_i$, the torpedo reaches a predicted laminar point intercept of the target.

Once the phases are defined, the ballistic parameters to characterize kinematic operation in each of the phases are determined by condensing three-dimensional dynamic operation into two-dimensional kinematic behavior. This process consisted of translating all motion into horizontal representations where time dependent parameters are replaced (where possible) by time invariant ballistic parameters in the various phases of the trajectory.

The complex kinematic trajectory from launch to intercept can now be represented using the ballistic parameters associated with each of the six phases in the two-dimensional vehicle model. These ballistic parameters are sets of ballistic constants that are dependent on the tactical settings or presets of the vehicle. The particular dependencies on tactical settings are a function of the phase of vehicle operation and are described using matrices to show these dependencies. A significant number of ballistic constants are necessary to completely define the plurality of possible kinematic trajectories. The matrices are used by the two-dimensional model when operating in the prelaunch control system computational loop in FIG. 1.

Figure 4:
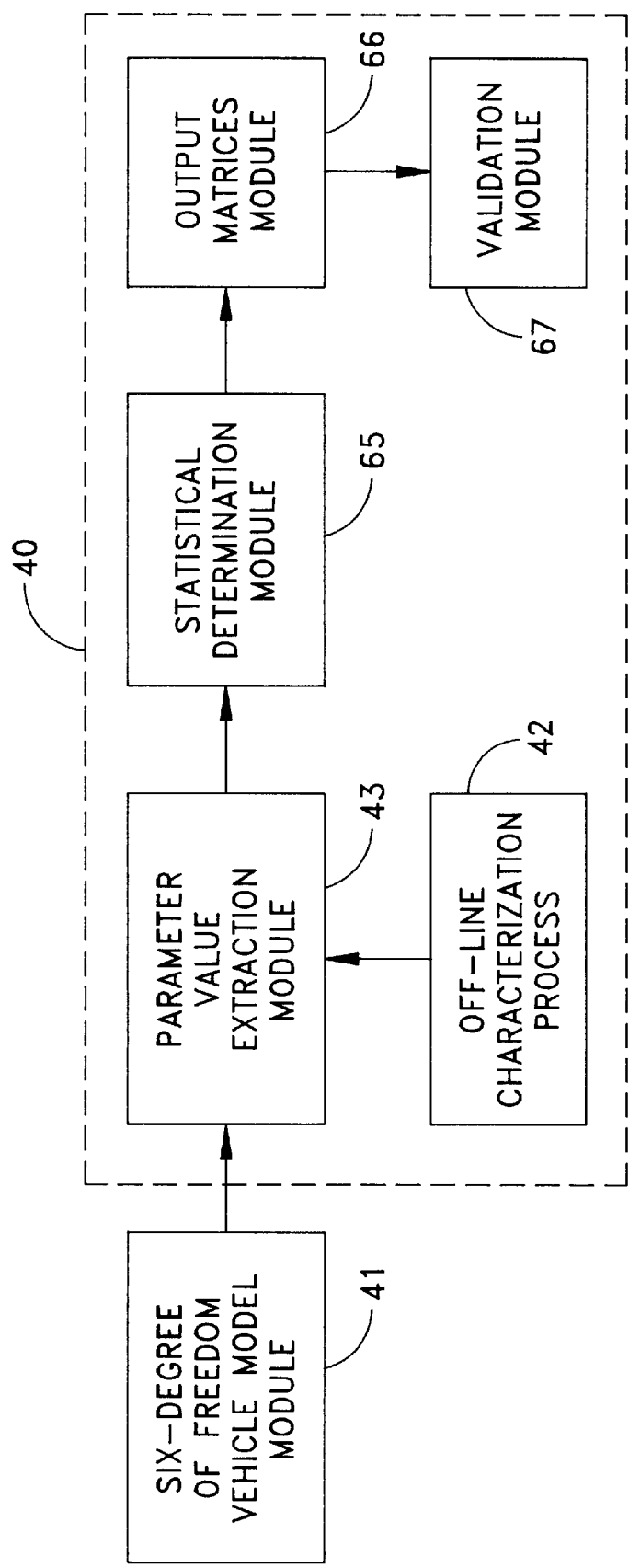
FIG. 4 is a block diagram of a system for generating ballistic constants for use in a generic torpedo model in accordance with this invention.

FIG. 4 depicts a system 40 in the form of modules and off-line processes that utilize a three-dimensional model module 41 and the data therefrom to obtain a set of ballistic constants that collectively apply to each of the foregoing individual phases. Each of the modules in system 40, as will become apparent, can be programmed on general purpose computers or special purpose computers.

As previously indicated, the six degree of freedom vehicle model module 41 generates the required vehicle raw output data from which the ballistic constants can be determined. This simulator 41 contains a six-degree of freedom dynamic model and provides information on vehicle dynamics at key event times as well as specified periodic time intervals. Essentially, and as known, the six degree of freedom vehicle model module 41 provides the raw trajectory data for each run in a timed sequence by providing the three-dimensional position, as well as other relevant dynamics (e.g., speed, course, etc.) of the torpedo, as a pursuing vehicle, relative to the launch position as a function of time.

The simulation begins at the launch time $T_f$. The origin of the coordinate system for output position data is referenced to the launch point with the x-axis aligned to the launcher axis. That is, the x-axis coincides with line trajectory 25 in FIG. 2. The evaluation of the accuracy of the kinematic models consists of matching the X and Y output data from the simulator to the X and Y positions of the kinematic models at the end of each of the individual trajectory phases shown in FIG. 3. This evaluation will require transformation to align the trajectory data from the six degree of freedom model to the coordinate system of the kinematic vehicle models. Such transformations are well known in the art.

An off-line characterization process 42 within system 40 provides the operating phases shown in FIG. 3 and the ballistic parameters or corresponding phases and ballistic parameters for other types of pursuing vehicles. Once the operating phases and parameters have been defined, a parameter value extraction module 43 analyzes the data from the three-dimensional vehicle model module 41. The module 41 has to be run thousands of times to provide the runs for a given set of operating parameters or presets.

Figure 5:
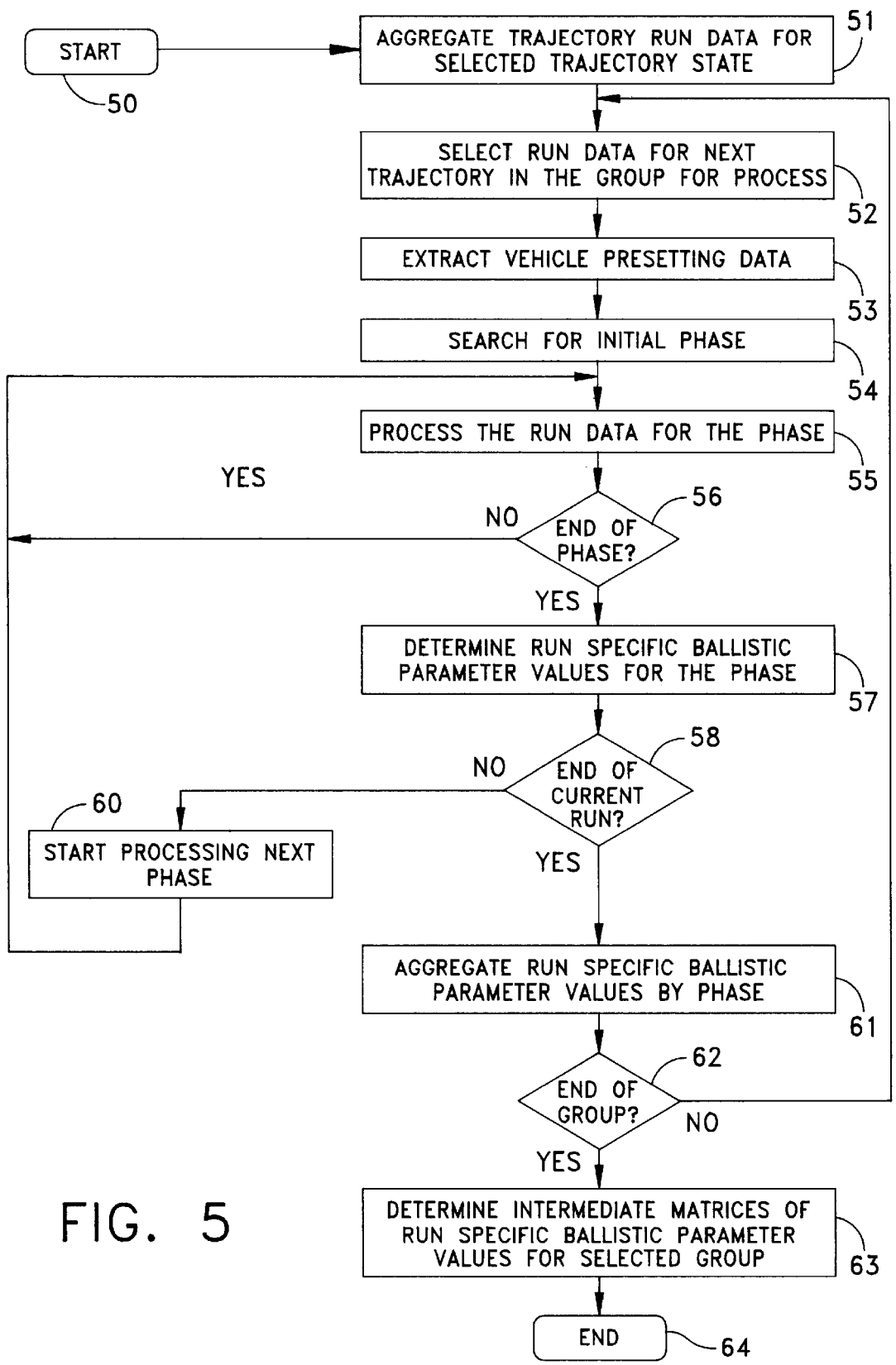
FIG. 5 is a flow chart that depicts the operation of a portion of the system shown in FIG. 4.

FIG. 5 depicts the operation of the parameter value extraction module 43 and begins in step 50 where the raw database from module 41 in FIG. 4 is received by module 43. This database is searched in step 51 to determine all the runs belonging to a selected trajectory state. The applicable runs are aggregated and stored for processing. The run data for the first/next run of the trajectory data grouping is selected in step 52, and pursuing vehicle pre-setting data is extracted in step 53 thereby to assist in the subsequent collation of the information by input conditions. In step 54 the parameter value extraction module 43 searches for the beginning of the first phase at launch time $T_f$ and at position 21 in FIG. 3. Data is processed in step 55 at successive time intervals and at the end of each interval step 56 determines whether the end of the operating phase has been reached. The process of step 55 continues until all the data for a particular one of the phases in FIG. 3 has been received.

When all the processing of the data for a particular run for one of the phases, such as the transient phase, has been completed, step 56 diverts to step 57 whereupon the data is analyzed to determine specific values for the ballistic parameters characterizing that phase of the run. At the end of each of the six phases, control then transfers to step 58 to determine if all the data for all the phases in the run have been completed. At the end of the first five of the six specific phases of FIG. 3, step 58 diverts to step 60 that starts processing the next phase and returns the system to step 55. At the end of a particular run (i.e., end of phase six), step 58 diverts to step 61 to then aggregate run specific ballistic parameter values by phase. If additional runs are involved in a particular group, step 62 then returns control to step 52 to begin the loop whereby the run data for the next run in the given group is selected. Once all the data has been processed from the group, step 62 diverts to step 63 to generate for each phase intermediate matrices of run specific ballistic parameter values. Consequently when the operation of the module 43 ends at step 64 the module 43 has generated a series of phase specific matrices that are an aggregation of run specific values for each individual ballistic constant.

Referring again to FIG. 4, a statistical determination module 65 analyzes the data in the matrices of run specific ballistic constants. In one embodiment the associated run specific values for each ballistic constant are averaged after editing of the outliers. In one particular approach, for example, for a given a phase and ballistic parameter, a statistical analysis is performed on the values of the run specific constants that may represent tens of thousands of runs. A standard deviation is obtained and all data that resides outside specified limits based on this standard deviation is removed from the data set and the remaining data is recomputed to obtain an average that represents the final ballistic constant. This procedure repeats for all the individual tactical settings or different sets of commands that generate different sets of runs for each ballistic parameter of each phase.

Figure 6:
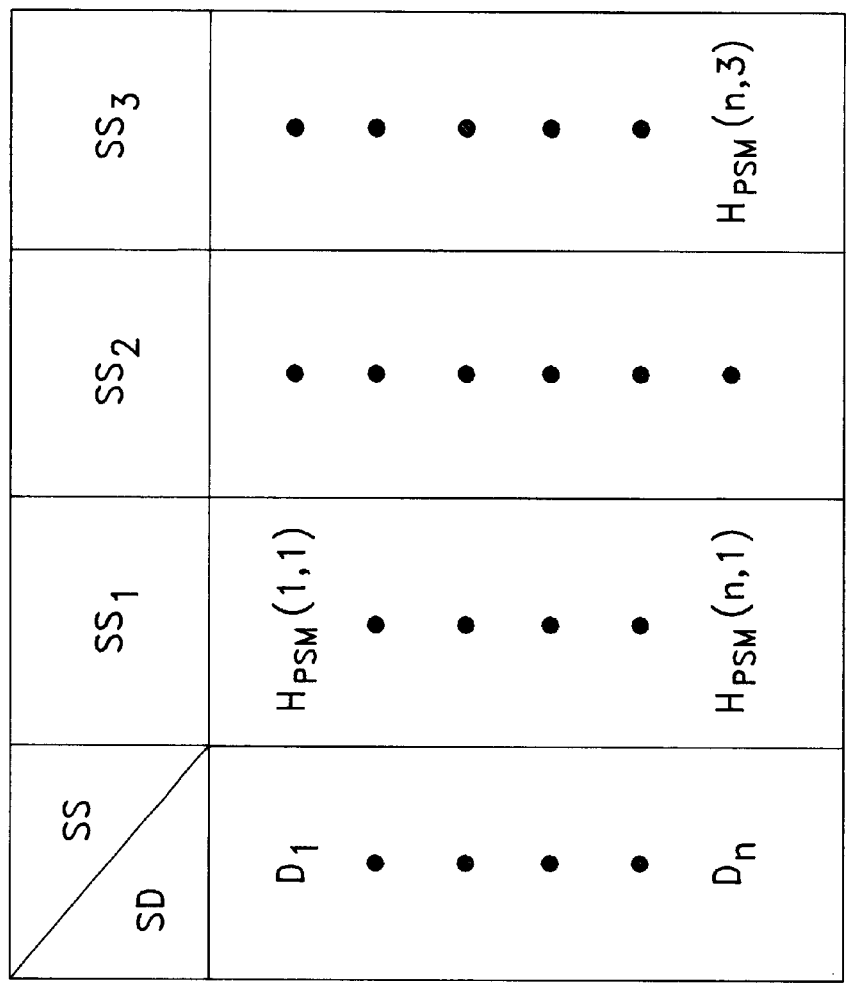
FIG. 6 is an example of the form of a ballistic constant matrix generated in accordance with this invention.

An output matrices module 66 utilizes the results of this statistical analysis to produce the output matrices in the proper format that can be stored and used by the weapon ballistic model 16 shown in FIG. 1. Each phase specific ballistic constant matrix will be based on a series of operating parameters. FIG. 6, for example, shows an array of HPSM constants representing the horizontal distance parameter for the passive sensor maneuver operating phase. The array of constants are dependent upon search depth (SD) and search speed (SS) presets. In this particular case "n" depths $d_1 \ldots d_n$ are arrayed against three speeds $SS_1$, $SS_2$ and $SS_3$.

A validation module 67 in FIG. 4 compares the trajectory results from the kinematic model such as the one used in FIG. 1 using the generated ballistic constants with the trajectory results from the six degree of freedom model module 41 to determine the resulting accuracy of the constants. Specifically the module 67 compares vehicle output positions produced by the six degree of freedom model module 41 and those generated by the two dimensional kinematic model used in FIG. 1 at the end of each phase along the trajectories. Tests to date have shown a close correlation during these validation processes.

In summary, there has been shown a method for generating ballistic constants that have a high degree of accuracy. The generation is automated, eliminating prior art manual complications. Consequently, and as another feature of this invention, the number of ballistic constants can be increased and the trajectories generated on the basis of successive phases. The accuracy of the positioning during each phase is then further improved because the ballistic constants for each phase can be determined with greater accuracy. This method also enables improved accuracy by increasing the number of constants to over 8,000 thereby to eliminating certain interpolations that might otherwise be needed.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A method for generating ballistic constants for a pursuing vehicle model from information in a data set representing for each of predetermined combinations of input conditions for the pursuing vehicle and for multiple runs thereof the performance of the pursuing vehicle in response to each predetermined combination, said method comprising the steps of:

defining a plurality of generic, sequential operating phases that apply to pursuing vehicles in a generic group in said multiple runs;

defining a plurality of generic, ballistic parameters, for each of said plurality of generic operating phase that apply to pursuing vehicles in a generic group;

extracting, for each run and for each operating phase in each run and for each ballistic parameter in each operating phase, predetermined parameter values according to information in 'the data set;

statistically determining ballistic constants from the extracted predetermined parameter values for each phase in all the runs for a given predetermined combination of input conditions; and generating, for each operating phase, matrices of ballistic constants for each of the predetermined combination of input conditions.

2. A method as recited in claim 1 wherein the pursuing vehicle is a torpedo launched from a submarine and said step of defining phases defines six operating phases and ballistic parameters characterizing these phases.

3. A method as recited in claim 2 wherein said phase defining step includes defining a first phase and ballistic parameters characterizing the first phase corresponding to an interval during which the torpedo travels along a predetermined path from launch until the initialization of a gyro turn.

4. A method as recited in claim 3 wherein the torpedo undergoes a plurality of maneuvers over an interval that is coextensive with the gyro turn and phase defining step includes defining a second phase and the ballistic parameters characterizing the second phase that corresponds to the interval from the start of the gyro turn to the completion of all the plurality of maneuvers including the gyro turn.

5. A method as recited in claim 4 wherein said phase defining step includes defining a third phase and the ballistic parameters characterizing the third phase corresponding to an interval from the completion of the plurality of maneuvers until the beginning of a maneuver that directs the torpedo to a final depth.

6. A method as recited in claim 5 wherein the torpedo is characterized by a predetermined search speed and depth and wherein said phase defining step includes defining a fourth phase and the ballistic parameters characterizing the fourth phase that corresponds to an interval during which the torpedo maneuvers to a final depth and reaches the predetermined search speed.

7. A method as recited in claim 6 wherein the torpedo is characterized by performing predetermined calibration tests after reaching the final depth and search speed and wherein said defining step includes the step of defining a fifth phase and ballistic parameters characterizing the fifth phase that corresponds to an interval required to perform the predetermined calibration tests.

8. A method as recited in claim 7 wherein the torpedo includes on-board sensors for searching for a target that are enabled upon completion of the predetermined calibration tests and wherein said phase defining step includes the step of defining the sixth phase and ballistic parameters characterizing the sixth phase that commences upon the enabling of the sensors.

9. A method for obtaining ballistic constants for use in determining a trajectory of any of a group of ballistic devices comprising the steps of:
    defining a plurality of generic, sequential operating phases that apply to all the ballistic devices in the group;
    defining a plurality of generic, ballistic parameters characterizing each operating phase that apply to all the ballistic devices in the group;
    generating data from a six degree of freedom model of a specific ballistic device under a variety of operating conditions over an interval incorporating all the defined sequential operating phases;
    extracting from the generated model data, values for said defined ballistic parameters for each of the operating conditions and for each of the operating phases;
    statistically determining ballistic constants from said ballistic parameter values for each of the operating conditions and operating phases; and
    generating, for each operating phase, matrices of ballistic constants for at least one operating condition.

10. A method as recited in claim 9 wherein said step of generating data provides for each operating condition data corresponding to a plurality of individual trajectories, the data in each individual trajectory constituting at least, in a timed sequence, the three-dimensional positions of a pursuing vehicle relative to a launch position and wherein said step of extracting the said ballistic parameter values includes extracting the said ballistic parameter values for each operating phase for each trajectory.

11. A method as recited in claim 10 wherein pursuing vehicle is a torpedo launched from a submarine and wherein said step of defining includes defining a first operating phase and ballistic parameters characterizing the first operating phase that corresponds to the interval during which the torpedo travels along a predetermined path from launch until the initialization of a gyro turn.

12. A method as recited in claim 11 wherein said step of defining includes defining a second operating phase and ballistic parameters characterizing the second operating phase that corresponds to the interval from the start of the gyro turn to the time the torpedo completes a plurality of maneuvers that are at least partially coextensive with the gyro turn.

13. A method as recited in claim 12 wherein said step of defining includes defining a third phase and ballistic parameters characterizing the third phase that corresponds to the interval from the completion of the plurality of maneuvers until the beginning of a maneuver by the torpedo to reach a final depth.

14. A method as recited in claim 13 wherein the torpedo is characterized by a predetermined search speed and depth and said step of defining includes defining a fourth phase and ballistic parameters characterizing the fourth phase that corresponds to the interval from the time during which the torpedo maneuvers to a final depth and reaches the predetermined search speed.

15. A method as recited in claim 14 wherein the torpedo is characterized by performing predetermined calibration tests after reaching the final depth and the predetermined search speed and said step of defining includes defining a fifth phase and ballistic parameters characterizing the fifth phase that corresponds to the interval required to perform the predetermined calibration tests.

16. A method as recited in claim 15 wherein the torpedo includes on-board sensors for searching for a target that are enabled upon completion of the predetermined calibration tests and said step of defining includes defining the sixth phase and ballistic parameters characterizing the sixth phase that commences upon the enabling of the sensors.

17. A method as recited in claim 16 wherein said step of statistically determining the ballistic constants includes performing a statistical analysis on the data for each operating phase and ballistic parameters characterizing each operating phase for a set of trajectories corresponding to a given set of operating conditions.

18. A method as recited in claim 17 wherein said statistical analysis comprises the steps of:
    determining, for each defined ballistic parameter of each operating phase for all the trajectories for a given set of operating conditions, an average value of the trajectory specific parameter values and a deviation range;
    eliminating the parameter values that fall outside the deviation range; and
    obtaining an average value of the remaining parameter values.

19. A method for obtaining ballistic constants for use in determining a trajectory of a generic class of torpedoes comprising the steps of:
    defining six generic, sequential operating phases for the torpedo generic class;
    defining a plurality of sets of generic ballistic parameter-values characterizing each operating phase for the torpedo generic class;
    defining a plurality of sets of input operating conditions for the torpedo generic class;
    generating a run data set representing data from a six degree of freedom model of the trajectory of the torpedo under each of the sets of input operating conditions, each entry in the run data set including a different run generated for a given set of input operating conditions;

extracting from the data of each run in the run set data said ballistic parameter values for each of the operating phases;

statistically determining, for each set of input operating conditions, ballistic constants from the ballistic parameter values for each set of input operating conditions and each operating phase; and generating, for each operating phase, matrices of ballistic constants for the operating conditions.

20. A method as recited in claim 19 wherein one of said generic class of torpedoes, after launch, travels along a predetermined path to a position at which it begins a gyro turn and at least one other maneuver coextensively with the gyro turn and thereafter changes depth to a final depth, calibrates on-board sensors for searching for a target and enables the on-board sensors and wherein said step of defining the operating phases includes the steps of defining:

a first operating phase and ballistic parameters characterizing the first operating phase that corresponds to the interval during which the torpedo travels along a predetermined path from launch until the initialization of a gyro turn;

a second operating phase and ballistic parameters characterizing the second operating phase that corresponds to the interval from the start of the gyro turn and ending when the torpedo completes a plurality of maneuvers that are at least partially coextensive with the gyro turn;

a third phase and ballistic parameters characterizing the third phase that corresponds to the interval from the completion of the plurality of maneuvers until the beginning of a maneuver to reach a final depth;

a fourth phase and ballistic parameters characterizing the fourth phase that corresponds to the interval during which the torpedo maneuvers to a final depth;

a fifth phase and ballistic parameters characterizing the fifth phase that corresponds to the interval required to perform the predetermined calibration tests; and the sixth phase and ballistic parameters characterizing the sixth phase that commences upon the enabling of the sensors.

* * * * *